C. E. RATCLIFFE.
NUT LOCK.
APPLICATION FILED DEC. 18, 1907.

900,589.  Patented Oct. 6, 1908.

Witnesses
Jas. K. M?Cathran
H. J. Riley

Charles E. Ratcliffe, Inventor
By
Attorney

UNITED STATES PATENT OFFICE.

CHARLES E. RATCLIFFE, OF PADUCAH, KENTUCKY.

NUT-LOCK.

No. 900,589.   Specification of Letters Patent.   Patented Oct. 6, 1908.

Application filed December 18, 1907. Serial No. 407,042.

*To all whom it may concern:*

Be it known that I, CHARLES E. RATCLIFFE, a citizen of the United States, residing at Paducah, in the county of McCracken and State of Kentucky, have invented a new and useful Nut-Lock, of which the following is a specification.

The invention relates to improvements in nut locks.

The object of the present invention is to improve the construction of nut locks, and to provide a simple, inexpensive and efficient device, capable of enabling a nut to be readily screwed on a bolt in the usual manner, and adapted to effectually prevent the same from accidentally unscrewing.

A further object of the invention is to provide a device of this character adapted also to enable a nut to be readily unscrewed without injuring the same or the bolt.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
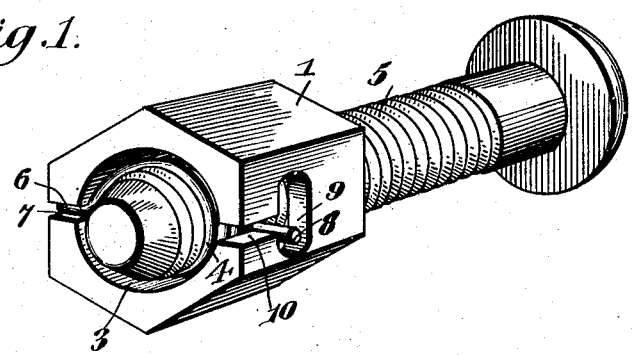
Figure 2:
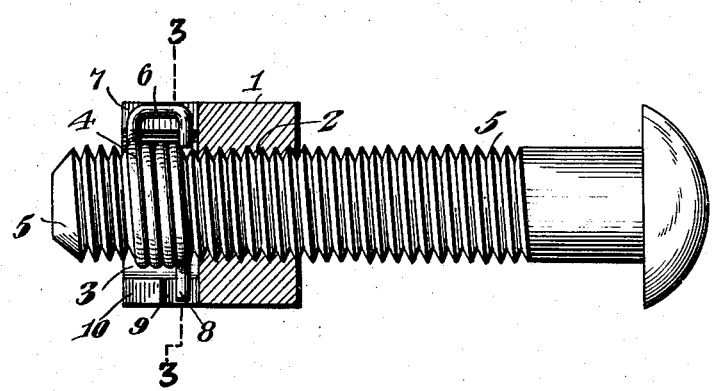
Figure 3:
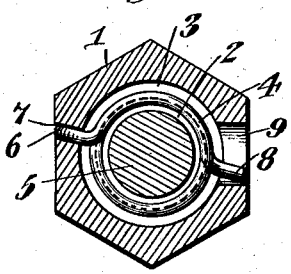
Figure 4:
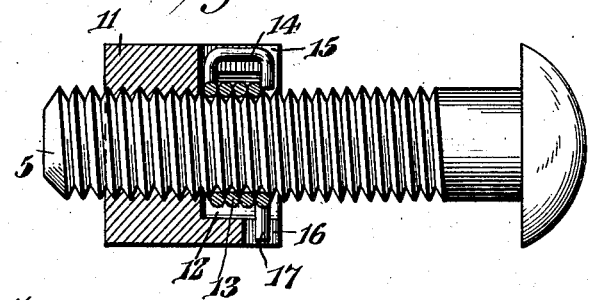
Figure 5:
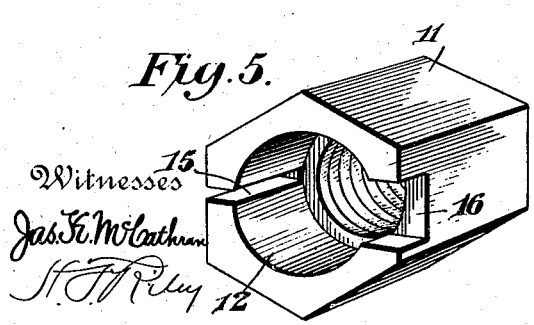

In the drawing:—Figure 1 is a perspective view of a nut provided with a locking device, constructed in accordance with this invention and shown applied to a bolt. Fig. 2 is a longitudinal sectional view of the same. Fig. 3 is a transverse sectional view on the line 3—3 of Fig. 2. Fig. 4 is a longitudinal sectional view, illustrating a modification of the invention, the locking spring being arranged at the inner or rear portion of the nut. Fig. 5 is a detail perspective view of the nut shown in Fig. 4.

Like numerals of reference designate corresponding parts in all the figures of the drawing.

The nut lock, which is designed particularly for use on railroad joints, machinery and other constructions subject to vibration, embodies a nut 1 having a threaded opening 2 and provided with a smooth counter bore 3, forming an annular chamber or space for the reception of a coiled locking spring 4, adapted to permit the nut to be readily screwed on a bolt 5 by means of a wrench or other suitable tool, and capable of tightly gripping the bolt to prevent any accidental backward movement of the nut. The smooth recess or chamber 3, which is arranged at the outer or front end of the nut 1, as illustrated in Figs. 1 and 2 of the drawing, may also be located at the rear end thereof, as shown in Fig. 4.

The locking spring consists of a series of coils of a diameter to tightly embrace the bolt and fit the threads thereof. The outer end of the spring is extended radially and bent longitudinally of the bolt to form a radially arranged longitudinally disposed loop 6, which is secured in a narrow slot 7 of the nut. The inner or rear end of the loop terminates at and fits against the rear side face of the rear coil. The rear or inner end of the locking spring is bent outwardly to form a radially arranged operating arm 8, which is located in a recess 9 of the nut. The slot 7 and the recess 9 are preferably arranged at diametrically opposite points to avoid any excessive weakening of the nut. The slot 7 extends longitudinally with relation to the bolt, and the loop 6 may be wedged or secured in the slot by any suitable means. When the spring is located at the outer or front portion of the nut, as shown in Figs. 1 and 2, the nut is provided with a longitudinal entrance slot 10, extending inwardly or rearwardly from the outer face of the nut to the recess 9, which is disposed transversely with relation to the bolt. This will enable the operating arm of the spring to be readily introduced into the recess 9 in assembling the parts.

The screwing of the nut on the bolt tends to expand the coils of the locking spring, so that the latter does not interfere with the inward movement of the nut on the bolt, but any retrograde rotation of the nut operates to draw the coils of the locking spring tightly around the bolt, which is securely clamped by the spring, whereby the nut is effectually prevented from accidentally unscrewing. Should it be desired to remove the nut, the operating arm is moved backward from one wall of the recess 9 to the opposite wall thereof to expand the coils of the spring, and thereby release the bolt.

In Figs. 4 and 5 of the drawing is illustrated a modification of the invention, the nut 11 being provided at its inner or rear portion with a counter bore 12 to receive the locking spring 13, constructed similar to that heretofore described. The loop 14 is arranged in a longitudinal slot 15, extending upwardly from the inner or rear face of the nut, and the latter is provided at a diametrically opposite point with a recess 16 to receive the operating arm 17 of the spring. As the recess and the operating arm are arranged at the rear face of the nut, an entrance slot is unnecessary, as will be readily understood.

As the coils of the spring fit the threads of the bolt, they are adapted to take the place of the threads of the nut, and the spring may be applied to a nut having a smooth bolt opening. Such a nut will then be adapted to screw on and off the bolt, and the spring will perform the double function of the threads and the locking device.

Having thus fully described my invention, what I claim as new and desire to secure by Letters Patent, is:—

1. A nut provided with an opening for the passage of a bolt and having a recess communicating with the opening, a locking spring arranged within the said opening and having its outer end rigidly secured to the nut and provided at its inner end with an operating arm located within the recess and adapted to be moved backward transversely of the nut to expand the coils of the spring for permitting the removal of the said nut.

2. A nut lock comprising a nut provided with a longitudinal slot and having a transverse recess, and a coiled locking spring provided at its outer end with a radially arranged longitudinally disposed loop extending into the longitudinal slot of the nut and held against transverse movement, the other end of the spring being movable transversely of the nut in the said recess to expand the coils.

3. A nut lock comprising a nut provided with a longitudinal slot and having a transverse recess, and a coiled locking spring arranged within the nut and provided at its outer end with a radially arranged loop extending longitudinally and terminating at and engaging the inner coil and secured within the longitudinal slot of the nut, the inner end of the spring being extended to form an operating arm and arranged in the transverse recess for expanding the coils.

4. A nut lock comprising a nut provided with a transverse recess and having an entrance slot extending from the front face of the nut to the recess, said nut being also provided with a longitudinal slot, and a coiled locking spring arranged within the nut and provided with an operating arm located within the said recess, said spring being also provided with a longitudinally disposed loop secured in the slot of the nut.

In testimony, that I claim the foregoing as my own, I have hereto affixed my signature in the presence of two witnesses.

CHARLES E. RATCLIFFE.

Witnesses:
WILLIAM G. McFADDEN,
JULIAN GREAR.